Patented Feb. 15, 1938

2,108,339

UNITED STATES PATENT OFFICE 2,108,339

BEARINGS, NEW COMPOSITION OF MATTER AND METHOD OF PRODUCING THE SAME

Morris P. Kirk and Isaac H. Grancell, Los Angeles, Calif.

No Drawing. Application December 14, 1936, Serial No. 115,810

2 Claims. (Cl. 106—23)

This invention pertains to a new composition of matter and method of producing the same.

Speaking more specifically the invention, considered as a method, relates to loading rubber with metallic lead. The metallic lead with which the rubber is loaded may or may not be previously treated with an oil, but the addition of the oil improves the product.

The formula for the preferred form of the invention, considered as a composition of matter, is as follows:

Thoroughly mix castor oil into pure metallic lead in a finely divided form.

While the rubber is being milled, add to its sufficient of the above stated composition of lead and oil to render the rubber more durable and wear-resisting and to give to the rubber thus treated the hardness and smoothness requisite for its use in the manufacture of bearings.

The proportionate amount of the lead and oil added to the rubber will depend upon the kind of bearing for which the complete composition is to be used. In bearings to be subjected to but little pressure only a small amount of the lead and oil composition will be added to a relatively large quantity of rubber; but for bearings to be subjected to heavy pressures proportionately more of the lead and oil will be used. Those skilled in the art to which this invention pertains will readily be able to determine desirable relative quantities of the ingredients in the complete composition, which is of a homogeneous character.

Rubber, when treated as aforesaid, retains a considerable measure of its elasticity and at the same time is given an added wear-resisting quality and an additional capacity for being given the hard, smooth, and slippery surface finish needed in bearings particularly when used in aqua-solutions.

In practice it is found that it is necessary to add oil-impregnated lead to raw rubber to produce a rubber body of sufficient wear-resisting quality and capacity for the formation therein of efficient bearing surfaces in bearings subjected to moderate pressures such, for example, as those required for the propeller shafts of boats or the like, which bearings are immersed in water or other aqua-solutions. Rubber bearings used in this situation when made of rubber which has been prepared in the manner above stated will be moisture proof and will also wear well and operate well. The rubber used for bearings, if subjected to heavier pressures, will need to be more heavily loaded with the composition of lead and oil provided by this invention, in proportion to the additional strains imposed upon them.

We claim:

1. A composition of matter consisting of rubber loaded with metallic lead which has been impregnated with castor oil, said composition being of a homogeneous character.

2. A composition of matter for use in aqua-bearings to be subject to pressures wherein raw rubber is evenly loaded with a composition of metallic lead wherein the lead is impregnated with castor oil, thereby producing a firm, vulcanized bearing body.

MORRIS P. KIRK.
ISAAC H. GRANCELL.